US011871210B2

(12) United States Patent
Lyren

(10) Patent No.: US 11,871,210 B2
(45) Date of Patent: Jan. 9, 2024

(54) SHARING LOCATIONS WHERE BINAURAL SOUND EXTERNALLY LOCALIZES

(71) Applicant: Philip Scott Lyren, Rincon, PR (US)

(72) Inventor: Philip Scott Lyren, Rincon, PR (US)

( * ) Notice: Subject to any disclaimer, the term of this patent is extended or adjusted under 35 U.S.C. 154(b) by 0 days.

(21) Appl. No.: 18/139,392

(22) Filed: Apr. 26, 2023

(65) Prior Publication Data

US 2023/0345198 A1 Oct. 26, 2023

Related U.S. Application Data

(63) Continuation of application No. 17/727,771, filed on Apr. 24, 2022, now Pat. No. 11,641,561.

(51) Int. Cl.
*H04S 7/00* (2006.01)
*H04R 3/12* (2006.01)
*H04R 5/04* (2006.01)
*H04R 5/033* (2006.01)

(52) U.S. Cl.
CPC ............... *H04S 7/304* (2013.01); *H04R 3/12* (2013.01); *H04R 5/033* (2013.01); *H04R 5/04* (2013.01); *H04R 2420/07* (2013.01); *H04S 7/305* (2013.01); *H04S 2400/11* (2013.01); *H04S 2420/01* (2013.01)

(58) Field of Classification Search
CPC .. H04S 7/304; H04S 7/00; H04R 3/12; H04R 5/033; H04R 5/04
See application file for complete search history.

(56) References Cited

U.S. PATENT DOCUMENTS 9,584,653 B1 * 2/2017 Lyren ...................... G06F 3/165
9,699,583 B1 * 7/2017 Lyren ...................... H04S 7/303
2015/0373477 A1 * 12/2015 Norris ............... H04M 3/53366 381/303
2018/0123813 A1 * 5/2018 Milevski ................ H04S 7/303

* cited by examiner

*Primary Examiner* — Olisa Anwah

(57) ABSTRACT

A method processes binaural sound to externally localize to a first user at a first location. This location is shared such that an electronic device processes the binaural sound to externally localize to a second user at a second location. The first and second locations occur at a same or similar location such that the first and second users hear the binaural sound as originating from the same or similar location.

19 Claims, 5 Drawing Sheets

SHARING LOCATIONS WHERE BINAURAL SOUND EXTERNALLY LOCALIZES

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

SUMMARY

Figure 1:
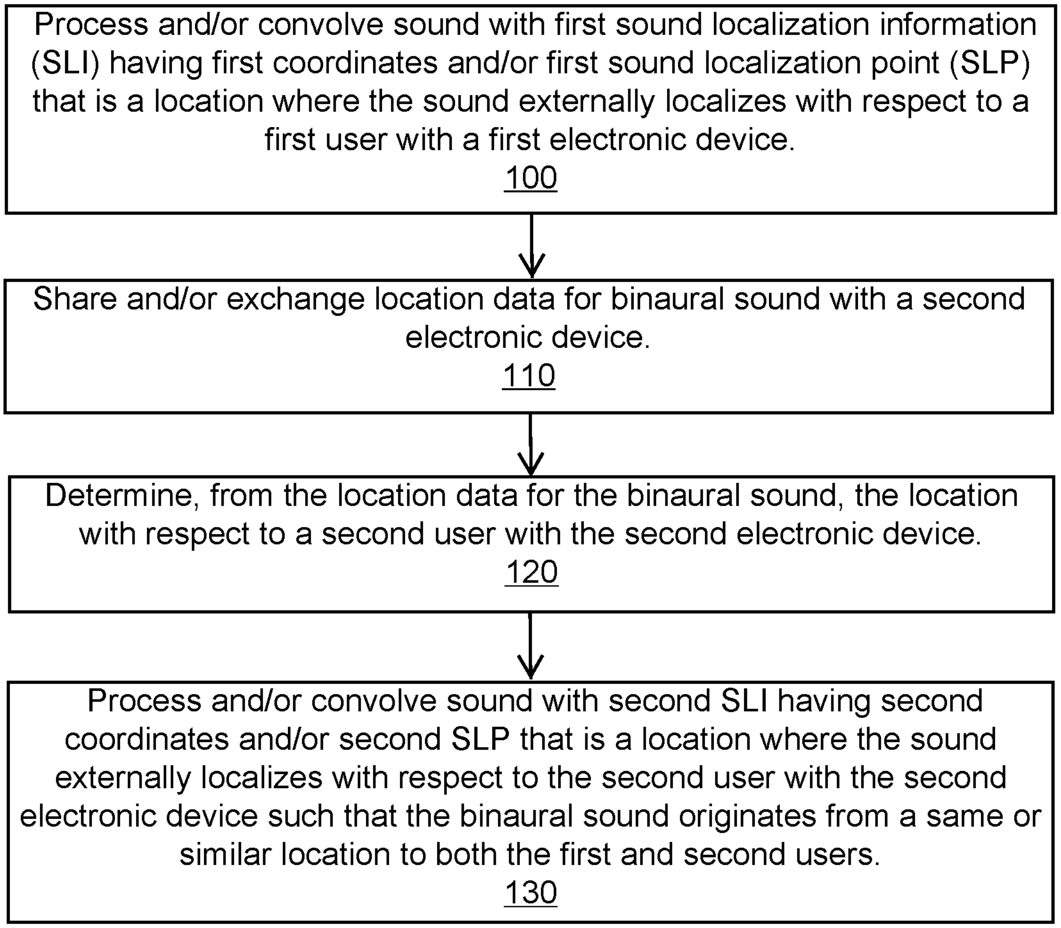
FIG. 1 is a method that provides binaural sound to originate from a same or similar location to two or more users in accordance with an example embodiment.

One example embodiment includes a method that processes binaural sound to externally localize to a first user at a first location. This location is shared such that an electronic device processes the binaural sound to externally localize to a second user at a second location. The first and second locations occur at a same or similar location such that the first and second users hear the binaural sound as originating from the same or similar location.

Other example embodiments are discussed herein.

DETAILED DESCRIPTION

Binaural sound or three-dimensional (3D) sound externally localizes away from a head of the listener, unlike stereo or mono sound that localizes inside the head of the listener wearing headphones or localizes to a physical sound speaker. Thus, when a listener hears binaural sound, a source or location of the sound occurs outside the head of the listener even though this location may be in empty space or space not occupied with a physical sound speaker generating the sound.

Binaural sound has many technical challenges and problems, especially when users exchange or play binaural sound during an electronic communication. Example embodiments offer solutions and improvements to these challenges and problems.

One problem occurs when two or more users want to hear binaural sound originating from a same or similar location. This sound can originate to different locations to different people, and this difference can cause confusion or hinder the user-experience.

Consider an example in which two people are in a room and conduct a conference call with a remote third party whose voice externally localizes as binaural sound in the room to the two people. If the two people do not hear the voice of the third party originating from the same location, then confusion occurs since one person talks to the voice as originating from one location and the second person talks to the voice as originating from a different location.

Consider another example in which two users want to hear music as binaural sound that originates from a stage. The first user hears the music as originating from the stage, but the second user hears the music as originating far away from the stage. The two users are unable to enjoy a virtual experience together of hearing the music originate from the stage since the music originates from different locations to the two users.

Another problem occurs because users may not want to share or may be unable to share head-related transfer functions (HRTFs) convolving the sound. For example, a user may want to keep his or her H RTFs private since they are customized or personalized to his or her body. As another example, a user may not know or have access to such HRTFS and thus be unable to share them with another user.

Furthermore, difficulties arise when users need to explain to each other where they are hearing the sound. The users may not be able to see each other or see the surroundings of each other, and hence an explanation or description of where one user hears sound is not relevant or useful to another user. The users will not be able to synchronize or coordinate locations for where they are hearing sounds originate.

These problems become exacerbated when the binaural sound does not have a visual image or element associated with the sound. Consider an example in which two users wear headphones and hear 3D sounds originating from their surrounding environment. For example, this environment includes people talking and other noises in a virtual soundscape. None of the sounds include an associated image, so the users rely on their imagination see visual the environment based on the virtual soundscape. If the users hears the same sounds as originating from different locations, then the two users will experience a different soundscape. For example, a first user hears a dog barking in front of them, but the second user hears the same dog barking behind them. Further, it would be difficult for the two users to describe where the sounds originate. For instance, the first user tells the second user "I hear the voice originating over there." The second user, however, responds, "Over there where?"

Example embodiments solve these problems and others and provide improvements in the field of binaural sound and telecommunications. Some examples of these improvements and solutions to these technical problems are provided below.

By way of example, example embodiments provide methods and apparatus that improve sharing of locations where binaural sound originates to users. Such embodiments enable two or more users to share locations where they hear binaural sound which, in turn, facilitates communication between the users and improves the user-experience.

As an example, electronic devices of users exchange coordinate locations that define where the respective user hears the binaural sound originating. Exchanging this information enables the electronic devices to determine the location where the other users hear the sound.

Example embodiments include exchanging or sharing the coordinate locations without providing the HRTFs. For example, an electronic device of a first user provides the coordinate location for where the first user hears binaural sound to an electronic device of a second user without also providing, sharing, exchanging, transmitting, or divulging the HRTFs of the first user. In this way, the HRTFs of the first user remain private to the first user. Additionally, the HRTFs may not be known or available to the first user and/or the electronic device of the first user.

Example embodiments include exchanging or sharing the coordinate locations with providing the HRTFs. For example, an electronic device of a first user provides the HRTFs convolving the sound to an electronic device of a second user. This electronic device receives the HRTFs, extracts the coordinate locations, and determines where the sound is currently localizing to the first user. Based on this information, a sound localization point (SLP) is calculated for the second user so both the first and second users hear the sound originating from a same or similar location.

Location data for binaural sound (such as HRTFs, SLPs, coordinate locations, etc.) can be shared and/or exchanged in real-time between two or more users. For example, electronic devices of the users stream or transmit this data in real-time while listening to the sound. In this way, the electronic device or devices is continuously apprised of the location where each respective user hears the sound as the users hear the sound. This exchange also enables the electronic devices to synchronize the SLPs for where the users are hearing the binaural sound. If a change in location of the sound or the user occurs, then the electronic device can adjust processing or convolving of the sound accordingly (e.g., adjusting convolution so both users continue to hear the sound originating from the same SLP when one or more of the users moves or one or more of the users move the SLP). As such, an example embodiment maintains synchronization of SLPs even as the users move with respect to the SLPs and/or as the SLPs move with respect to the users.

Example embodiments include verifying that two or more users hear the sound externally localizing to a same or similar location. For example, electronic devices share location data for binaural sound (such as HRTFs, SLPs, coordinate locations, etc.). This data reveals where the users hear the sound and provides information to verify the locations are or are not equivalent. For instance, coordinates of a SLP for one user are compared with coordinates of a SLP for another user. This comparison reveals locations of the two SLPs with respect to each other. Example embodiments provide other ways to verify whether users externally localize binaural sound to a same, similar, or different location.

FIG. 1 is a method that provides binaural sound to originate from a same or similar location to two or more users.

Block 100 states process and/or convolve sound with first sound localization information (SLI) having first coordinates and/or first sound localization point (SLP) that is a location where the sound externally localizes with respect to a first user with a first electronic device.

For example, a processor (such as a digital signal processor(DSP) or other type of processor) processes or convolves the sound with one or more of head-related transfer functions (HRTFs), head-related impulse responses (HRIRs), room impulse responses (RIRs), room transfer functions (RTFs), binaural room impulse responses (BRIRs), binaural room transfer functions (BRTFS), interaural time delays (ITDs), interaural level differences (ITDs), and a sound impulse response.

One example embodiment processes or convolves the sound with sound localization information (SLI) so multiple different users simultaneously hear the sound as originating from a same or similar location. For instance, each person hears the sound originating from a common sound localization point (SLP) in a virtual reality (VR) environment, augmented reality (AR) environment, or a real, physical environment.

Sound includes, but is not limited to, one or more of stereo sound, mono sound, binaural sound, computer-generated sound, sound captured with microphones, and other sound. Furthermore, sound includes different types including, but not limited to, music, background sound or background noise, human voice, computer-generated voice, and other naturally occurring or computer-generated sound.

When the sound is recorded or generated in mono sound or stereo sound, convolution changes the sound to binaural sound. For example, one or more microphones record a human person speaking in mono sound or stereo sound, and a processor processes this sound with filters to change the sound into binaural sound.

The processor or sound hardware processing or convolving the sound can be located in one or more electronic devices or computers including, but not limited to, headphones, smartphones, tablet computers, electronic speakers, head mounted displays (HMDs), optical head mounted displays (OHMDs), electronic glasses (e.g., glasses that provide augmented reality (AR)), servers, portable electronic devices (PEDs), handheld portable electronic devices (HPEDs), wearable electronic devices (WEDs), and other portable and non-portable electronic devices. These electronic devices can also be used to execute example embodiments.

In one example embodiment, the DSP is located in the electronic device of one of the users or listeners. In other example embodiments, the DSP is located in other electronic devices, such as a server or other electronic device not physically with the user (e.g., a laptop computer, desktop computer, or other electronic device located near the user).

The DSP processes or convolves stereo sound or mono sound with a process known as binaural synthesis or binaural processing to provide the sound with sound localization cues (ILD, ITD, and/or HRTFs) so the listener externally localizes the sound as binaural sound or 3D sound.

HRTFs can be obtained from actual measurements (e.g., measuring HRIRs and/or BRIRs on a dummy head or human head) or from computational modeling. HRTFs can also be general HRTFs (also known as generic HRTFs) or customized HRTFs (also known as individualized HRTFs). Customized HRTFs are specific to an anatomy of a particular listener. Each person has unique sets or pairs of customized HRTFs based on the shape of the ears or pinnae, head, and torso. By way of example, HRTFs include generic HRTFs (e.g., ones retrieved from a database of a person with similar physical attributes) and customized or individualized HRTFs (e.g., ones measured from the head of the listener).

An example embodiment models the HRTFs with one or more filters, such as a digital filter, a finite impulse response (FIR) filter, an infinite impulse response (IIR) filter, etc. Further, an ITD can be modeled as a separate delay line.

When the binaural sound is not captured (e.g., on a dummy head or human head), the captured sound is convolved with sound localization information (SLI). This information includes one or more of HRTFs, HRIRs, BRTFs, BRIRs, ILDs, ITDs, and/or other information discussed herein. By way of example, SLI are retrieved, obtained, or received from memory, a database, a file, an electronic device (such as a server, cloud-based storage, or another electronic device in the computer system or in communication with a PED providing the sound to the user through one or more networks), etc. Instead of being retrieved from memory, this information can also be calculated in real-time.

A central processing unit (CPU), processor (such as a DSP), or microprocessor processes and/or convolves the sound with the SLI, such as a pair of head related transfer functions (HRTFs), ITDs, and/or ILDs so that the sound will localize to a zone, area, or sound localization point (SLP). For example, the sound localizes to a specific point (e.g., localizing to point (r, θ, ϕ)) or a general location or area (e.g., localizing to far-field location (θ, ϕ) or near-field location (θ, ϕ)). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle (θ), and/or an elevation angle (ϕ).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener as the customized HRTFs.

A HRTF is a function of frequency (f) and three spatial variables, by way of example (r, θ, ϕ) in a spherical coordinate system. Here, r is the radial distance from a recording point where the sound is recorded or a distance from a listening point where the sound is heard to an origination or generation point of the sound; θ(theta) is the azimuth angle between a forward-facing user at the recording or listening point and the direction of the origination or generation point of the sound relative to the user; and ϕ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A “near-field” distance is one measured at about one meter or less; whereas a “far-field” distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates (r, θ, ϕ) for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as “a” and “b” coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information are calculated or extracted from the HRTF data files. A unique set of HRTF information (including r, θ, ϕ) is determined for each unique HRTF.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person (e.g., when the sound is provided as mono sound or stereo sound). Sound can also switch between externally localizing and internally localizing, such as appearing to move and pass through a head of a listener.

SLI can also be approximated or interpolated based on known data or known SLI, such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40° are approximated from the two known locations. These approximated HRTFs are provided to convolve sound to localize at the desired coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file or sound clip) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example, the input signals are convolved into binaural audio output that is specific or individualized for the listener based on one or more of the impulse responses to the listener.

The FIR filters are derived binaural impulse responses. Alternatively or additionally, the FIR filters are obtained from another source, such as generated from a computer simulation or estimation, generated from a dummy head, retrieved from storage, computed based on known impulse responses captured from people, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location (θ, ϕ) with discrete Fourier transforms (DFTs) calculated for the left and right ears. The ITD is located at the point for which the function attains its maximum value, known as the argument of the maximum or arg max as follows:

$$ITD = \arg\max(\tau)\sum_{n} dl,\,\theta,\,\phi(n)\cdot dr,\,\theta,\,\phi(n+\tau).$$

Subsequent sounds are filtered with the left HRTF, right HRTF, and/or ITD so that the sound localizes at (r, θ, ϕ). Such sounds include filtering stereo and monaural sound to localize at (r, θ, ϕ). For example, given an input signal as a monaural sound signal s(n), this sound is convolved to appear at (θ, ϕ) when the left ear is presented with:

$$s_l(n)=s(n-ITD)\cdot d_{l,\theta,\phi}(n);$$

and the right ear is presented with:

$$s_r(n)=s(n)d_{r,\theta,\phi}(n).$$

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau)=x(\tau)\cdot h(\tau)=\int_0^\infty x(\tau-t)\cdot h(t)\cdot dt.$$

This reduces to a summation when the impulse response has a given length N and the input signal and the impulse response are sampled at t=iDt as follows:

$$y(i)=\sum_{j=0}^{N-1} x(i-j)\cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is preprocessed to generate left and right audio streams that are mapped to one or more sound sources or sound localization points (known as SLPs). These streams are convolved with a binaural impulse response for the left ear and the right ear to generate the left and right binaural output sound signal. The output sound signal is further processed depending on a final destination. For example, a cross-talk cancellation algorithm is applied to the output sound signal when it will be provided through loudspeakers or applying artificial binaural reverberation to provide 3D spatial context to the sound.

As noted, an example embodiment processes and/or convolves sound with sound localization information (SLI). SLI is information that is used to process or convolve sound so the sound externally localizes as binaural sound or 3D sound to a listener. Sound localization information includes all or part of the information necessary to describe and/or render the localization of a sound to a listener. For example, SLI is in the form a file with partial localization information, such as a direction of localization from a listener, but without a distance. An example SLI file includes convolved sound. Another example SLI file includes the information necessary to convolve the sound or in order to otherwise achieve a particular localization. As another example, a SLI file includes complete information as a single file to provide a computer program (such as a media player or a process executing on an electronic device) with data and/or instructions to localize a particular sound along a complex path around a particular listener.

Consider an example of a media player application that parses various SLI components from a single sound file that includes the SLI incorporated into the header of the sound file. The single file is played multiple times, and/or from different devices, or streamed. Each time the SLI is played to the listener, the listener perceives a matching localization experience. An example SLI or SLI file is altered or edited to adjust one or more properties of the localization in order to produce an adjusted localization (e.g., changing one or more SLP coordinates in the SLI, changing an included HRTF to a HRTF of a different listener, or changing the sound that is designated for localized).

The SLI can be specific to a sound, such as a sound that is packaged together with the SLI, or the SLI can be applied to more than one sound, any sound, or without respect to a sound (e.g., an SLI that describes or provides an RIR assignment to the sound). SLI can be included as part of a sound file (e.g., a file header), packaged together with sound data such as the sound data associated with the SLI, or the SLI can stand alone such as including a reference to a sound resource (e.g., link, uniform resource locator or URL, filename), or without reference to a sound. The SLI can be specific to a listener, such as including HRTFs measured for a specific listener, or the SLI can be applied to the localization of sound to multiple listeners, any listener, or without respect to a listener. Sound localization information can be individualized, personal, or unique to a particular person (e.g., HRTFs obtained from microphones located in ears of a person). This information can also be generic or general (e.g., stock or generic HRTFs, or ITDs that are applicable to several different people). Furthermore, sound localization information (including preparing the SLI as a file or stream that includes both the SLI and sound data) can be modeled or computer-generated.

Information that is part of the SLI can include but is not limited to, one or more of localization information, impulse responses, measurements, sound data, reference coordinates, instructions for playing sound (e.g., rate, tempo, volume, etc.), and other information discussed herein. For example, localization information provides information to localize the sound during the duration or time when the sound plays to the listener. For instance, the SLI specifies a single SLP or zone at which to localize the sound. As another example, the SLI includes a non-looping localization designation (e.g., a time-based SLP trajectory in the form of a set of SLPs, points or equation(s) that define or describing a trajectory for the sound) equal to the duration of the sound. For example, impulse responses include, but are not limited to, impulse responses that are included in convolution of the sound (e.g., head related impulse responses (HRIRs), binaural room impulse responses (BRIRs)) and transfer functions to create binaural audial cues for localization (e.g., head related transfer functions (HRTFs), binaural room transfer functions (BRTFs)). Measurements include data and/or instructions that provide or instruct distance, angular, and other audial cues for localization (e.g., tables or functions for creating or adjusting a decay, volume, interaural time difference (ITD), interaural level difference (ILD) or interaural intensity difference (IID)). Sound data includes the sound to localize, particular impulse responses or particular other sounds such as captured sound. Reference coordinates include information such as reference volumes or intensities, localization references (such as a frame of reference for the specified localization (e.g., a listener's head, shoulders, waist, or another object or position away from the listener) and a designation of the origin in the frame of reference (e.g., the center of the head of the listener) and other references.

Sound localization information can be obtained from a storage location or memory, an electronic device (e.g., a server or portable electronic device), a software application (e.g., a software application transmitting or generating the sound to externally localize), sound captured at a user, a file, or another location. This information can also be captured and/or generated in real-time (e.g., while the listener listens to the binaural sound).

By way of example, the sound localization information (SLI) are retrieved, obtained, or received from memory, a database, a file, an electronic device (such as a server, cloud-based storage, or another electronic device in the computer system or in communication with a PED providing the sound to the user through one or more networks), etc. For instance, this information includes one or more of HRTFs, ILDs, ITDs, and/or other information discussed herein. As noted, this information can also be calculated in real-time.

An example embodiment processes and/or convolves sound with the SLI so the sound localizes to a particular area or point with respect to a user. The SLI required to process and/or convolve the sound is retrieved or determined based on a location of the SLP. For example, if the SLP is located one meter in front of a face of the listener and slightly off to a right side of the listener, then an example embodiment retrieves the corresponding HRTFs, ITDs, and ILDs and convolves the sound to this location. The location can be more specific, such as a precise spherical coordinate location of (1.2 m, 25°, 15°), and the HRTFs, ITDs, and ILDs are retrieved that correspond to this location. For instance, the retrieved HRTFs have a coordinate location that matches or approximates the coordinate location of the location where sound is desired to originate to the user. Alternatively, the location is not provided but the SLI is provided (e.g., a software application provides the DSP with the HRTFs and other information to convolve the sound).

Block 110 states share and/or exchange location data for binaural sound with a second electronic device.

Location data for binaural sound includes, but is not limited to, one or more of the following: HRTF(s), SLI, SLP(s), coordinate location(s), a description for where a location where the user hears the sound externally localizing, a signal that describes or identifies the SLP, a reference point for where the sound externally localizes, an object (e.g., an object in a room or other location where the users are located), an tag or radio frequency identification (RFID), a location of the user(s) and/or an electronic device (e.g., a portable or wearable electronic device with the user), or other location data that describes or identifies a location of one or more of the users and/or their respective electronic devices.

The location data can be directly or indirectly shared and/or exchanged. For example, an electronic device of one user wirelessly transmits the location data to an electronic device of another user. For example, an electronic device of one user retrieves, receives, or obtains the location data from a server, network location, storage location, or storage device. For example, a server receives the location data from an electronic device and provides this location data to another electronic device (e.g., an electronic device of or in communication with a user). As another example, the electronic devices do not provide their location data with each other but with another electronic device, such as a server, laptop, control box, etc.

Consider an example in which two or more users wear or carry a portable electronic device (PED, such as a smartphone, augmented reality (AR) glasses, headphones, head mounted display (HMD), smart watch, etc.) that includes location and/or head tracking of the user. These PEDs communicate with each other and/or with a server and exchange location data and/or data pertaining to head movements from the head tracking. In this way, the PEDs and/or server know the location of the PEDs and/or users as they move. Sharing and/or exchanging of the location data further enables the PEDs and/or server to know and/or track the locations of the SLPs for the users.

In an example embodiment, the first coordinates and/or first SLP are shared with the second electronic device without sharing the first HRTFs with the second electronic device and/or the second user. In another example embodiment, the first coordinates and/or first SLP are shared with the second electronic device with sharing the first HRTFs with the second electronic device and/or the second user.

Consider an example in which two users wear wearable electronic devices while being located in a same physical or virtual environment. Head tracking in the wearable electronic device tracks the locations and/or head orientations/movements of the wearer and send this information back to another electronic device, such as a server, laptop computer, control box, etc. The wearable electronic devices are set or activated to share location data with each other, neighboring wearable electronic devices, and/or other devices. As such, the wearable electronic devices transmit and share their location and/or head tracking data to the other electronic device. This electronic device calculates or knows the locations and/or head orientations/movements of the wearer since the data is being shared with the electronic device.

Block 120 states determine, from the location data for the binaural sound, the location with respect to a second user with the second electronic device.

Example embodiments execute any one of multiple different techniques to determine one or more of the locations of the users and/or their electronic devices, the SLP(s) for the users, and other objects with or near the users.

For example, these locations are provided or shared between the users and/or electronic devices, calculated from known locations in a real or virtual environment, calculated from known distances to users or objects (including electronic devices), calculated from signal transmissions (e.g., triangulation, signal strength received at an electronic device, etc.), calculated from head orientations or head movements (e.g., sensed with head tracking), calculated from Internet of Things (IoT) data, calculated from GPS or heading information (e.g., compass direction or moving direction of the user), calculated from indoor positioning system (IPS) data, calculated from one or more sensors (including position sensors, RFIDs, or tags), etc.

Consider an example in which location data includes one or more of global positioning system (GPS) coordinates, compass directions, IPS coordinates, a location or coordinates of an electronic tag or RFID or electronic device, a location or coordinates of a bar code or other readable medium, an identification of an electronic device (e.g., an IP address, network address, MAC address, etc.), a description of a place or object (e.g., on the sofa), a virtual or real address of a location, a virtual or real location (e.g., a name of a virtual chat room), a distance to or location with respect to a known object, a location in a software program or game (e.g., level II at room 139), and other coordinate or location data discussed herein.

Location data can also include a time and/or date. For example, this information includes providing the current time when the electronic device and/or user is at the location, providing a past time when the electronic device and/or user was at the location, providing a future time when the electronic device and/or user will be at the location.

Consider an example that determines orientations and/or locations based on Euler angles with respect to a fixed coordinate system or a mobile frame of reference. Orientation can thus be defined according to rotation about three axes of a coordinate system (with the Euler angles defining these rotations) and/or with elemental geometry. Such rotations can be extrinsic (i.e., rotation about xyz axes of a stationary coordinate system) or intrinsic (i.e., rotation about XYZ axes of a rotating coordinate system).

Euler angles can be calculated for a given reference frame using either matrix algebra (e.g., writing three vectors as columns of a matrix and comparing them to a theoretical matrix) or elemental geometry (e.g., calculation from Tait-Bryan angles).

Consider an example in which two points (i1 and i2) are known, and the goal is to find the location of a third point (i3) in which all three points are in 3D space. For this example, assume unit vectors of all sides form a triangle with i2 having a 90° angle. A position of xyz for i3 is calculated as follows:

(1) Define unit vector A from i1 to i3, unit vector B from i2 to i3, and unit vector C from i1 to i2.

(2) Compute distance (d) between i1 and i2 as:

$$d=|i2-i1|.$$

(3) Define θ as the angle of i1 such that:

$$\cos\theta=\vec{A}\cdot\vec{C}.$$

(4) Since d=r(cos θ), solve for i3 as:

$$i3=i1+\frac{|i2-i1|}{\vec{A}\cdot\vec{C}}\vec{A}.$$

Binaural sound localizes to a location in 3D space to a user. This location is external to and away from the body of the user (e.g., to a location in empty space, a location with an AR or VR image, or a location to an object or electronic device without a speaker).

An electronic device, software application, and/or a user determines the location for a user who will hear the sound produced in his physical environment or in an augmented reality (AR) environment or a virtual reality (VR) environment. The location can be expressed in a frame of reference of the user (e.g., the head, torso, or waist), the physical or virtual environment of the user, or other reference frames. Further, this location can be stored or designated in memory or a file, transmitted over one or more networks, determined during and/or from an executing software application, or determined in accordance with other examples discussed herein. For example, the location is not previously known or stored but is calculated or determined in real-time. As another example, the location is determined at a point in time when a software application makes a request to externally localize the sound to the user or executes instructions to externally localize the sound to the user. Further as noted, the location can be in empty or unoccupied 3D space or in 3D space occupied with a physical object or a virtual object.

The location and/or location data can also be stored at and/or originate from a physical object or electronic device that is separate from the electronic device providing the binaural sound to the user (e.g., separate from the electronic earphones, HMD, WED, smartphone, or other PED with or on the user). For instance, the physical object is an electronic device that wirelessly transmits its location or the location where to localize sound to the electronic device processing and/or providing the binaural sound to the user. Alternatively, the physical object can be a non-electronic device (e.g., a teddy bear, a chair, a table, a person, a picture in a picture frame, etc.).

Consider an example in which the location is at a physical object (as opposed to the location being in empty space). In order to determine a location of the physical object and hence the location where to localize the sound, the electronic system executes or uses one or more of object recognition (such as software or human visual recognition), an electronic tag located at the physical object (e.g., RFID tag), global positioning satellite (GPS), indoor positioning system (IPS), Internet of things (IoT), sensors, network connectivity and/or network communication, or other software and/or hardware that recognize or locate a physical object.

The location can be a general area and not a specific or precise point. For example, zones can be defined in terms of one or more of the locations of the objects, such as a zone defined by points within a certain distance from the object or objects, a linear zone defined by the points between two objects, a surface or 2D zone defined by points within a perimeter having vertices at three or more objects, a 3D zone defined by points within a volume having vertices at four or more objects, etc. Some of the discussed methods and other methods for determining the location of objects determine a location of objects as well as locations near the object location to varying distances. The data that describes the nearby locations can be used to define a zone. For example, a sensor measures the strength of radio signals in an area. A software application analyzes the sensor data and determines two maximum measured strengths at (0, 0, 0), and (0, 1, 0) that correspond to the locations of two signal emitters. The software application analyzes the two coordinates and designates them as two SLPs. Alternatively, areas around these locations form a zone (e.g., two spheres) that define the locations.

Additionally, the location may be in empty space and based on a location of a physical object. For example, the location in empty space is next to or near a physical object (e.g., within an inch, a few inches, a foot, a few feet, a meter, a few meters, etc. of the physical object). The physical object can thus provide a relative location or known location for the location in empty space since the location in empty space is based on a relative position with respect to the physical object. For example, the location is designated as occurring at or in front of a wall or other object.

Consider an example in which the physical object transmits a coordinate location to a smartphone or wearable electronic device (WED) of a user. The smartphone or WED includes hardware and/or software to determine its own coordinate location and a point of direction or orientation of the user (e.g., a compass direction where the smartphone or WED is pointed or where the user is looking or directed, such as including head tracking). Based on this coordinate and directional information, the smartphone or WED calculates a location proximate to the physical object (e.g., away from but within one meter of the physical object). This location becomes the SLP. The smartphone or WED retrieves sound localization information (SLI) corresponding to, matching or approximating this SLP, convolves the sound with this SLI, and provides the convolved sound as binaural sound to the user so the binaural sound localizes to the SLP that is proximate to the physical object.

Location and/or location data can include a general direction, such as to the right of the listener, to the left of the listener, above the listener, behind the listener, in front of the listener, etc. Location can be more specific, such as including a compass direction, an azimuth angle, an elevation angle, a coordinate location (e.g., an X-Y-Z coordinate), or an orientation. Location can also include distance information that is specific or general. For example, specific distance information would be a number, such as 1.0 meters, 1.1 meters, 1.2 meters, etc. as measured from a sensor, such as a position sensor or infrared sensor. General distance information would be less specific or include a range, such as the distance being near-field, the distance being far-field, the distance being greater than one meter, the distance being less than one meter, the distance being between one to two meters, etc.

As one example, a portable electronic device or PED (such as a handheld portable electronic device (HPED) or a WED) communicates with the physical object using radio frequency identification (RFID) or near-field communication (NFC). For instance, the PED includes a RFID reader or NFC reader, and the physical object includes a passive or active RFID tag or a NFC tag. Based on this communication, the PED determines a location and other information of the physical object with respect to the PED.

As another example, a PED reads or communicates with an optical tag or quick response (QR) code that is located on or near the physical object. For example, the physical object includes a matrix barcode or two-dimensional bar code, and the PED includes a QR code scanner or other hardware and/or software that enables the PED to read the barcode or other type of code.

As another example, the PED includes Bluetooth low energy (BLE) hardware or other hardware to make the PED a Bluetooth enabled or Bluetooth Smart device. The physical object includes a Bluetooth device and a battery (such as a button cell) so that the two enabled Bluetooth devices (e.g., the PED and the physical object) wirelessly communicate with each other and exchange information.

As another example, the physical object includes an integrated circuit (IC) or system on chip (SoC) that stores information and wirelessly exchanges this information with the PED (e.g., information pertaining to its location, identity, angles and/or distance to a known location, etc.).

As another example, the physical object includes a low energy transmitter, such as an iBeacon transmitter. The transmitter transmits information to nearby PEDs, such as smartphones, tablets, WEDs, and other electronic devices that are within a proximity of the transmitter. Upon receiving the transmission, the PED determines its relative location to the transmitter and determines other information as well.

As yet another example, an indoor positioning system (IPS) locates objects, people, or animals inside a building or structure using one or more of radio waves, magnetic fields, acoustic signals, or other transmission or sensory information that a PED receives or collects. In addition to or besides radio technologies, non-radio technologies can be used in an IPS to determine position information with a wireless infrastructure. Examples of such non-radio technology include, but are not limited to, magnetic positioning, inertial measurements, and others. Further, wireless technologies can generate an indoor position and be based on, for example, a Wi-Fi positioning system (WPS), Bluetooth, RFID systems, identity tags, angle of arrival (AoA, e.g., measuring different arrival times of a signal between multiple antennas in a sensor array to determine a signal origination location), time of arrival (ToA, e.g., receiving multiple signals and executing trilateration and/or multi-lateration to determine a location of the signal), received signal strength indication (RSSI, e.g., measuring a power level received by one or more sensors and determining a distance to a transmission source based on a difference between transmitted and received signal strengths), and ultra-wideband (UWB) transmitters and receivers. Object detection and location can also be achieved with radar-based technology (e.g., an object-detection system that transmits radio waves to determine one or more of an angle, distance, velocity, and identification of a physical object).

One or more electronic devices in the IPS, network, or electronic system collect and analyze wireless data to determine a location of the physical object using one or more mathematical or statistical algorithms. Examples of such algorithms include an empirical method (e.g., k-nearest neighbor technique) or a mathematical modeling technique that determines or approximates signal propagation, finds angles and/or distance to the source of signal origination, and determines location with inverse trigonometry (e.g., trilateration to determine distances to objects, triangulation to determine angles to objects, Bayesian statistical analysis, and other techniques).

The PED determines information from the information exchange or communication exchange with the physical object. By way of example, the PED determines information about the physical object, such as a location and/or orientation of the physical object (e.g., a GPS coordinate, an azimuth angle, an elevation angle, a relative position with respect to the PED, etc.), a distance from the PED to the physical object, object tracking (e.g., continuous, continual, or periodic tracking of movements or motions of the PED and/or the physical object with respect to each other), object identification (e.g., a specific or unique identification number or identifying feature of the physical object), time tracking (e.g., a duration of communication, a start time of the communication, a stop time of the communication, a date of the communication, etc.), and other information.

As yet another example, the PED captures an image of the physical object and includes or communicates with object recognition software that determines an identity and location of the object. Object recognition finds and identifies objects in an image or video sequence using one or more of a variety of approaches, such as edge detection or other CAD object model approach, a method based on appearance (e.g., edge matching), a method based on features (e.g., matching object features with image features), and other algorithms.

In an example embodiment, the location or presence of the physical object is determined by an electronic device (such as a WED, HPED, or PED) communicating with or retrieving information from the physical object or an electronic device (e.g., a tag) attached to or near the physical object.

In another example embodiment, the electronic device does not communicate with or retrieve information from the physical object or an electronic device attached to or near the physical object (e.g., retrieving data stored in memory). Instead, the electronic device gathers location information without communicating with the physical object or without retrieving data stored in memory at the physical object.

As one example, the electronic device captures a picture or image of the physical object, and the location of the object is determined from the picture or image. For instance, when a size of a physical object is known, distance to the object can be determined by comparing a relative size of the object in the image with the known actual size.

As another example, an electromagnetic radiation source in or with the electronic device bounces electromagnetic radiation off the object and back to a sensor to determine the location of the object. Examples of electromagnetic radiation include, but are not limited to, radio waves, infrared light, visible light, and electromagnetic radiation in other spectrums.

As yet another example, the location of the physical object is not determined by communicating with the physical object. Instead, the electronic device or a user of the electronic device selects a direction and/or distance, and the physical object at the selected direction and/or distance becomes the selected physical object. For example, a user holds a smartphone and points it at a compass heading of 270° (East). An empty chair is located along this compass heading and becomes the designated physical object since it is positioned along the selected compass heading.

Consider another example in which the physical object is not determined by communicating with the physical object. An electronic device (such as a PED) includes one or more inertial sensors (e.g., an accelerometer, gyroscope, and magnetometer) and a compass. These devices enable the PED to track a position and/or orientation of the PED. A user or the PED designates and stores a certain orientation as being the location where sound will localize. Thereafter, when the orientation and/or position changes, the PED tracks a difference between the stored designated location and the changed position (e.g., its current position).

Consider another example in which an electronic device captures video with a camera and displays this video in real time on the display of the electronic device. The user taps or otherwise selects a physical object shown on the display, and this physical object becomes the designated object. The electronic device records a picture of the selected object and orientation information of the electronic device when the object is selected (e.g., records an X-Y-Z position, and a pitch, yaw and roll of the electronic device).

As another example, a three-dimensional (3D) scanner captures images of a physical object or a location (such as one or more rooms), and three-dimensional models are built from these images. The 3D scanner creates point clouds of various samples on the surfaces of the object or location, and a shape is extrapolated from the points through reconstruction. A point cloud can define the zone. The extrapolated 3D shape can define a zone. The 3D generated shape or image includes distances between points and enables extrapolation of 3D positional information for each object or zone. Examples of non-contact 3D scanners include, but are not limited to, time-of-flight 3D scanners, triangulation 3D scanners, and others.

An initial orientation of a 3D object in a physical or virtual space can be defined by describing the initial orientation with respect to two axes of or in the frame of reference of the physical and/or virtual space. Alternatively, the initial orientation of the 3D object can be defined with respect to two axes in a common frame of reference and then describing the orientation of the common frame of reference with respect to the frame of reference of the physical or virtual space. In the case of a head of a listener, an initial orientation of the head in a physical or virtual space can be defined by describing both of, in what direction the "top" of the head is pointing with respect to a direction in the environment (e.g., "up", or toward/away from an object or point in the space), and in what direction the front of the head (the face) is pointing in the space (e.g., "forward", or north). Successive orientations of the head of a listener can be similarly described, or described relative to the first or successive orientations of the head of the listener (e.g., expressed by Euler angles or quaternions). Further, a listener often rotates his or her head in an axial plane to look left and right (a change in yaw) and/or to look up and down (a change in pitch), but less often rotates his or her head to the side in the frontal plane (a change in roll) as the head is fixed to the body at the neck. If roll rotation is constrained, not predicted, or predicted as unlikely, then successive relative orientations of the head are expressed more easily such as with pairs of angles that specify differences of yaw and pitch from the initial orientation. For ease of illustration, some examples herein do not include a change in head roll but discussions of example embodiments can be extended to include head roll.

For example, an initial head position of a listener in a physical or virtual space is established as vertical or upright or with the top of the head pointing up, thus establishing a head axis in the frame of reference of a world space such as the space of the listener. Also, the face is designated as pointing toward an origin heading or "forward" or toward a point or object in the world space, thus fixing an initial head orientation about the established vertical axis of the head. Continuing the example, head rotation or roll in the frontal plane is known to be or defined as constrained or unlikely. Thereafter an example embodiment defines successive head orientations with pairs of angles for head yaw and head pitch being differences in head yaw and head pitch from an initial or reference head orientation. Angle pairs of azimuth and elevation can also be used to describe successive head orientations. For example, azimuth and elevation angles specify a direction with respect to the forward-facing direction of an initial or reference head orientation. The direction specified by the azimuth and elevation angle pair is the forward-facing direction of the successive head orientation.

One example embodiment tracks how the heads of the listeners move, moved, or will move while the listeners listen to binaural sound that externally localizes to one or more SLPs, including SLPs of virtual sound sources fixed in space (e.g., SLPs of virtual sound sources fixed in a reference frame of the environment of the listener). For example, an example embodiment tracks head movements of a listener while the listener talks during a telephone call, while the listener listens to music or other binaural sound through headphones or earphones, or while the listener wears a HMD that executes a software program.

Block 130 states process and/or convolve sound with second SLI having second coordinates and/or second SLP that is a location where the sound externally localizes with respect to the second user with the second electronic device such that the binaural sound originates from a same or similar location to both the first and second users.

Consider an example in which two users wearing headphones, earphones, or an HMD meet each other in a VR room or real room. The two users desire to hear binaural sound that originates from a same or similar location. The electronic devices of the users share their respective location data and/or head orientations. Based on this location data, an electronic device determines relative locations and/or head orientations of the two users and selects HRTFs with coordinates so both users simultaneously hear from a common SLP. For example, both uses hear the sound originate from a same location in empty space, a same physical object, a same virtual object, etc.

Consider an example in which a software program executing on a PED of a first user provides binaural sound to the first user. The software program determines that the binaural sound will or may localize to SLP-1 having spherical coordinates (4.5 m, 30°, 10°) with respect to a current location and forward looking direction of the first user. The software program has access to many HRTFs for the listener but does not have the HRTFs with coordinates that correspond to the specific location at SLP-1. The software program retrieves several HRTFs with coordinates close to or near the location of SLP-1 and interpolates the HRTFs for SLP-1. By way of example, in order to interpolate the HRTFs for SLP-1, the software program executes one or more mathematical calculations that approximate the HRTFs for SLP-1. Such calculations can include determining a mean or average between two known SLPs, calculating a nearest neighbor, or executing another method to interpolate a HRTF based on known HRTFs. The software program shares these coordinates and calculations with a software program and/or PED of a second user so both the first and second user can hear the sound originating from a common location.

Two or more speakers play the sound to the user so that the user hears the sound as 3D sound or binaural sound. For example, the speakers are in an electronic device or in wired or wireless communication with an electronic device. For instance, the speakers include, but are not limited to, headphones, electronic glasses with speakers for each ear, earbuds, earphones, head mounted displays with speakers for each ear, and other wearable electronic devices with two or more speakers that provide binaural sound to the listener.

For example, the sound externally localizes in empty space or space that is physically occupied with an object (e.g., localizing to a surface of a wall, to a chair, to a location above an empty chair, etc.).

Figure 2:
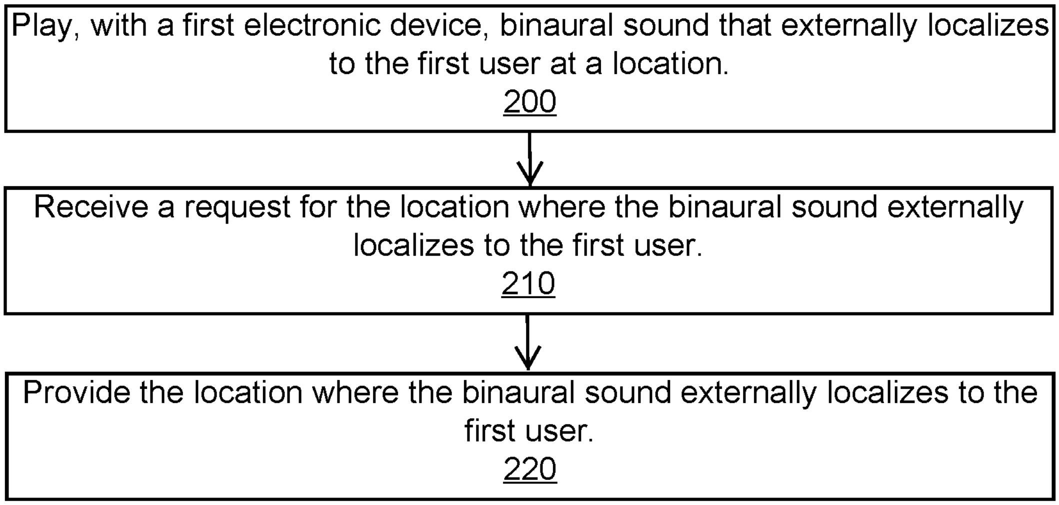
FIG. 2 is a method that provides a location to an electronic device where binaural sound externally localizes to a user in accordance with an example embodiment.

FIG. 2 is a method that provides a location to an electronic device where binaural sound externally localizes to a user.

Block 200 states play, with a first electronic device of a first user, binaural sound that externally localizes to the first user at a location.

The sound plays to the listener as binaural sound that externally localizes away from or outside of the head of the listener. For example, headphones, speakers, bone conduction, or earphones provide this sound at one or more sound localization points (SLPs).

Block 210 states receive a request for the location where the binaural sound externally localizes to the first user.

For example, the second electronic device transmits a request for the location where the binaural sound is currently externally localizing to the first user, will (at a future time) externally localize to the first user, or did (at a previous time) externally localize to the first user. For instance, the second electronic transmits the request to the first electronic device or another electronic device in communication with the first electronic device.

As another example, the second electronic device does not transmit the request. Instead, another electronic device transmits and/or provides the request, such as a server, remote control, or another electronic device.

By way of example, in response to a request from a user, electronic device, program, or software program, an electronic device submits or provides a request to know the location where the binaural sound externally localizes to the first user.

Block 220 states provide the location where the binaural sound externally localizes to the first user.

For example, location data is provided to second electronic device, an electronic device in communication with the second electronic device, or another electronic device.

Consider an example in which a first WED or PED of a first user provides binaural sound to a SLP. A second user desires to hear the sound as originating from the same SLP. A second WED or PED of the second user transmits a request for location data for the SLP, receives the location data, retrieves HRTFs corresponding to the location data, and convolves the sound so it externally localizes to the SLP. The first and second users hear the sound as originating from the same SLP (e.g., a same location in a real or virtual room, environment, etc.).

Consider an example in which a first user is engaged in an electronic communication or telephone call with a third party. A voice of the third party externally localizes as binaural sound to a SLP (e.g., an image that appears on a chair). A second user desires to join the call and provides a request to join. In response to this request, an electronic device transmits a location of the SLP to the second user and/or his or her electronic device. Based on this information, the electronic device selects SLI so the SLP of the second user overlaps or coincides with the SLP of the first user. In this way, both users hear the voice of the third party as originating from a common location (e.g., the image that appears on the chair).

Figure 3:
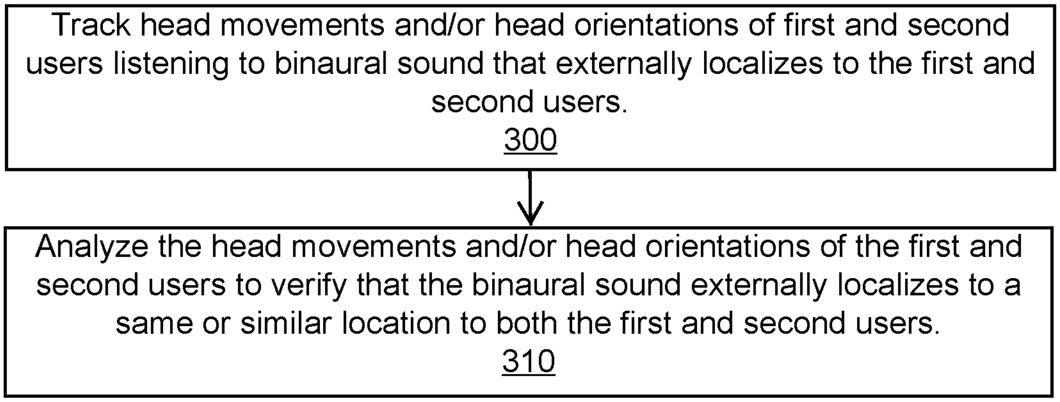
FIG. 3 is a method that verifies two users hear binaural sound originating from a same or similar location in accordance with an example embodiment.

FIG. 3 is a method that verifies two users hear binaural sound originating from a same or similar location.

Block 300 states track head movements and/or head orientations of first and second users listening to binaural sound that externally localizes to the first and second users.

For example, one or more sensors or head tracking hardware and/or software track head movements of the first and second users. The electronic device includes head tracking that tracks or measures head movements of the listener while the listener hears the sound. When the sound plays to the listener, the head tracking determines, measures, or records the head movement or head orientation of the listener.

The electronic device calculates and/or stores the head orientations and/or head movements in a coordinate system, such as a Cartesian coordinate system, polar coordinate system, spherical coordinate system, or other type of coordinate system. For instance, the coordinate system includes an amount of head rotation about (e.g., yaw, pitch, roll) and head movement along (e.g., (x, y, z)) one or more axes. Further, an example embodiment executes to Euler's Rotation Theorem to generate axis-angle rotations or rotations about an axis through an origin.

By way of example, head tracking includes one or more of an accelerometer, a compass, a gyroscope, a magnetometer, inertial sensor, MEMs sensor, video tracking, camera, optical tracking (e.g., using one or more upside-down cameras), etc. For instance, head tracking also includes eye tracking and/or face tracking or facial feature tracking.

Head tracking can also include positional tracking that determines a position, location, and/or orientation of electronic devices (e.g., wearable electronic devices such as HMDs), controllers, chips, sensors, and people in Euclidean space. Positional tracking measures and records movement and rotation (e.g., one or more of yaw, pitch, and roll). Positional tracking can execute various different methods and apparatus. As one example, optical tracking uses inside-out tracking or outside-in tracking. As another example, positional tracking executes with one or more active or passive markers. For instance, markers are attached to a target, and one or more cameras detect the markers and extract positional information. As another example, markerless tracking takes an image of the object, compares the image with a known 3D model, and determines positional change based on the comparison. As another example, accelerometers, gyroscope, and MEMs devices track one or more of pitch, yaw, and roll. Other examples of positional tracking include sensor fusion, acoustic tracking, and magnetic tracking.

Consider an example in which a wearable electronic device (WED) tracks or knows the location of SLPs or objects (e.g., a sofa, a SLP, an image, and a chair at different locations in a room with a user). For example, locations of objects are known based on reading RFID tags, object recognition, signal exchange between the WED and an electronic device in the object, or sensors in an Internet of Things (IoT) environment. Based on a current head orientation of the user, the WED selects an HRTF pair and convolves sound so the sound originates from the location of the sofa.

Block 310 states analyze the head movements and/or head orientations of the first and second users to verify that the binaural sound externally localizes to a same or similar location to both the first and second users.

For example, an electronic device compares head movements recorded, sensed, or calculated from the first and second users. This comparison reveals whether the first and second users hear the binaural sound from a same, similar, or common SLP.

Different type of information can be assessed to determine whether the sound externally localizes to a same or similar location for two or more users. For example, coordinates or locations of SLPs for each user are compared with each other to determine if the SLPs occur at a similar or same location. For example, compare the azimuth and/or elevation coordinates of the SLPs in a common reference frame or coordinate system to determine of the SLPs overlap or exist at same or nearby locations. For instance, once the coordinates of the SLPs are known, calculate the distance between these two SLPs. This distance provides an indication of how close the SLPs are to each other.

Other information provides an indication of whether the sound externally localizes to a same or similar location for two or more users. By way for example, this information includes, but is not limited to, analyzing, comparing, and/or determining whether eyes of the users are looking at the same location, head positions (e.g., forward looking direction) of the users are pointed at the same location, bodies of the two users face the same location, users speak toward or at the same location, users provide hand, head, or body gesture towards the location, user provide a verbal acknowledgement of the same location, etc.

For example, upon hearing an audio cue or seeing a visual cue (e.g., an image), the users look at or toward the SLP. Data on head orientation and/or gaze at this time provides an indication where the users are hearing the sound. For example, if the lines of sight or forward-looking direction of the users will cross at a location where the common SLP exists.

Consider an example in which a head tracker tracks head orientations with a compass. Two users are standing right next to each other (e.g., shoulder-to-shoulder) while the first user looks in a Northeast (NE) direction (e.g., 45°) and the second user looks in a Northwest (NW) direction (e.g., 315°). A binaural sound plays from a Northern direction several meters away from the two users who hear the sound thru speakers in WEDs. In response to hearing this sound, the first user rotates his or her head left 45° to face North, and the second user rotates his or her head right 45° to face North. Both users hear the sound originating from the same SLP since they both now face and look North to the SLP.

Consider an example in which two users wear HMDs that include a camera and headphones or earphones that provide binaural sound. While the users look at the SLP (e.g., while hearing the binaural sound), the cameras captures images of what the user sees (e.g., capture an image or video of the looking direction of the user). Object recognition software compares the two images and determines that both users are looking at an empty sofa from where the sound is intended to originate. This comparison verifies that both users are looking at or toward the same object and the same or similar SLP.

One problem occurs when the location of where the users hear the sound changes, and the users no longer hear the sound originate from a same or similar location. Once the users hear the sound originating from a same or similar location, a possibility exists that the users will no longer hear the sound originate from the same or similar location after a period of time, after they move, or the SLP moves. For instance, the users may initially hear the sound originate from the same SLP but after they move with respect to the SLP, the sound originates from different locations. This situation can occur because individuals perceive sounds differently and their perception of the SLP can change over time as they move with respect to the SLP. This situation can also occur when the SLP moves with respect to the user even if the users are remaining stationary. Additionally, the SLP can change with changing of the HRTFs, ITDs, ILDs, and other SLI.

An example embodiment solves this problem by tracking head and/or body movements of the users and synchronizing the SLPs for where the users hear the sound originating.

Figure 4:
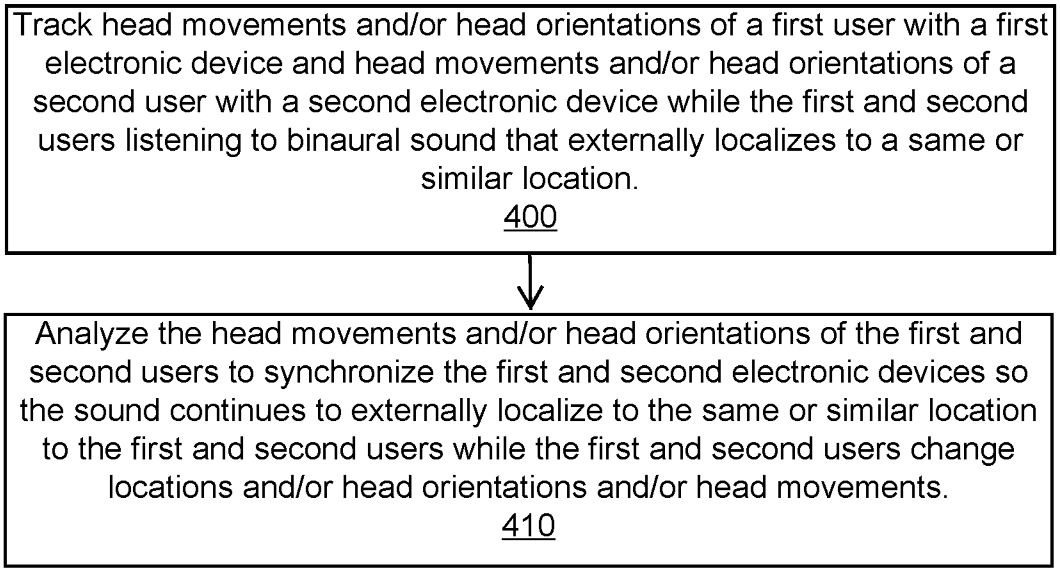
FIG. 4 is a method that synchronizes two electronic devices providing binaural sound to a same or similar location to two users in accordance with an example embodiment.

FIG. 4 is a method that synchronizes two electronic devices providing binaural sound to a same or similar location to two users.

Block 400 states track head movements and/or head orientations of a first user with a first electronic device and head movements and/or head orientations of a second user with a second electronic device while the first and second users listening to binaural sound that externally localizes to a same or similar location.

For example, an electronic device tracks or determines one or more of head orientations, head movements, body orientations, body movements, a direction or movement of the users, and a location of the users. The determination can occur before the user or users hear the sound, while the user or users hear the sound, and/or after the user or users hear the sound.

Example embodiments discussed herein provide various examples of hardware, software, and methods for making one or more of these determinations. For example, one or more of an accelerometer, gyroscope magnetometer, compass, camera, and sensor provide information for these determinations.

Block 410 states analyze the head movements and/or head orientations of the first and second users to synchronize the first and second electronic devices so the sound continues to externally localize to the same or similar location to the first and second users while the first and second users change locations and/or head orientations and/or head movements.

One way to synchronize the electronic devices so the sound continues to externally localize to a same or similar SLP is to repeatedly, continuously, continually, or periodically execute one or more of the following: share and/or exchange location data (e.g., HRTFs or SLI processing or convolving the sound for the users or discussed in connection with block 110), share and/or exchange location information of the users (e.g., recalculate or re-determine block 120 and/or provide the location per block 220), share and/or exchange head tracking or head orientations of the users (e.g., information calculated per blocks 300 and/or 310), and request the user or users to notify the electronic device where the user(s) hears the sound (e.g., ask the user to provide the location of where the user perceives the SLP).

Consider an example in which two users wear WEDs and initially hear the sounds originate from a same or similar location while meeting and talking in a VR location or space (e.g., during an electronic communication with each other or while playing a VR software game). At this time, the users hear sounds originating from the same locations. For example, both users hear the sound of a VR bird perched on a tree, hear the sound of car from the road, hear the voice of a third party from an image of the third party, etc. Thereafter, the WEDs share data or information to ensure the WEDs are synchronized to the provide the sounds to the same or similar locations. In this way, the users continue to believe they are at the same location, seeing the same sights, and hearing the same sounds originate from the same locations.

Figure 5:
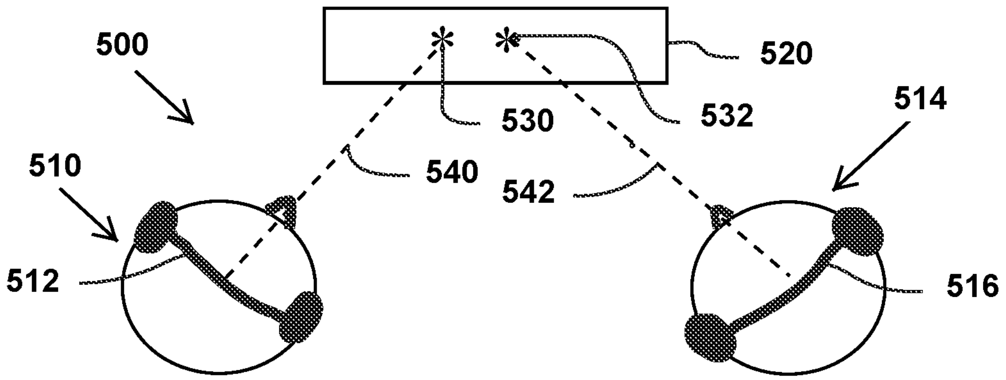
FIG. 5 is an electronic system or computer system in which two users and listen to binaural sound that externally localizes to a same or similar location in accordance with an example embodiment.

FIG. 5 is an electronic system or computer system 500 in which two users 510 and 514 listen to binaural sound that externally localizes to a same or similar location.

The first user 510 wears a wearable electronic device 512 (such as a HMD, wearable electronic glasses, headphones, earphones, smartphone, etc.) that provides binaural sound to the first user. The first user 510 has a line of sight or forward facing direction 540 to a sound localization point (SLP) 530 that occurs on or near an object 520.

The second user 514 wears a wearable electronic device 516 (such as a HMD, wearable electronic glasses, headphones, earphones, smartphone, etc.) that provides binaural sound to the second user. The second user 514 has a line of sight or forward facing direction 542 to a sound localization point (SLP) 532 that occurs on or near the object 520.

As shown in FIG. 5, the SLP 530 of the first user 510 and the SLP 532 of the second user 514 do not exist at an exact same location but exist at a similar location near each other. In this way, both the first and second users hear the binaural sound originating from a similar or common location, and this fact is indicated since both users have a line of sight or forward looking direction to a common location.

By way of illustration, this common location occurs at or on the object 520. Examples of such an object include real objects, virtual objects, and augmented reality objects. Further, such objects can be electronic devices or non-electronic devices (e.g., a surface of wall, a chair, a stage, an image, a picture, a video, an animation, an emoji, etc.). Furthermore, example embodiments are not limited to the SLP being on, at, or near an object. For example, the SLP can exist in empty space (e.g., where no physical, real object exists).

Consider an example embodiment of a first method that provides binaural sound to two or more users to a same or similar location. An electronic device (e.g., a first WED worn by a first user) convolves or processes sound with first HRTFs having first coordinates that define a location with respect to the first user where the first user hears the sound. These coordinates are shared with or provided to another electronic device (e.g., a second WED worn by a second user). This other electronic device determines (from the first coordinates) second coordinates that define a location with respect to the second user where the second user hears the sound. An electronic device (e.g., the second WED worn by the second user) convolves or processes the sound with second HRTFs having the second coordinates such that the binaural sound externally localizes to both the first and second users at a same or similar location. In this way, both users share an experience of hearing the same sound from a common location.

Consider the example embodiment of the first method in which the binaural sound plays to the first and second users as music that localizes in empty space. The first WED receives, from the second WED, a request for the location in empty space so both the first and second users can hear the music from the same location. In response to this request, the first WED wirelessly transmits the coordinate location to the second WED. The second WED retrieves HRTFs for the second user corresponding to this received coordinate location, processes the sound with the HRTFs, and plays the sound as the music that externally localizes as the binaural sound to the second user to the location in empty space so both the first and second users hear the music from the same location.

Consider the example embodiment of the first method in which the first HRTFs are customized to the first user and not shared with the second user but are kept private to the first user. For example, the first HRTFs are maintained encrypted or not shared with the second WED.

Consider the example embodiment of the first method in which the first coordinates are different than the second coordinates, and the location in empty space occurs at least three feet away from a head of the first user and at least three feet away from a head of the second user but at the same location.

Consider the example embodiment of the first method in which the first WED tracks first head movements of the first user and the second WED tracks second head movements of the second user. An electronic device (e.g., the first WED, the second WED, both, or another electronic device) verifies that both the first and second users hear the sound externally localizing to the same location by sharing the first head movements with the second headphones and by sharing the second head movements with the first headphones.

Consider the example embodiment of the first method in which the method maintains the second HRTFs private by transmitting, from the second WED worn by the second user to the first WED worn by the first user, the second coordinates without transmitting the second HRTFs to the first headphones.

Consider the example embodiment of the first method in which the method transmits, from the first WED and to the second WED, a location of the first user in a room and transmits, from the second WED and to the first WED, a location of the second user in the room. An electronic device then verifies that both the first and second users hear the sound externally localizing to the same location by comparing the location of the first user in the room with respect to the location in empty space and by comparing the location of the second user in the room with respect to the location in empty space.

Consider an example embodiment of a second method that shares locations where sound externally localizes to listeners. An electronic device (e.g., a first WED worn by a first listener) processes sound with first HRTFs so the sound externally localizes as binaural sound to a location in empty space at least one meter away from a head of the first listener. The electronic device shares, with a second electronic device (e.g., a second WED worn by a second listener), a first coordinate location that defines the location in empty space with respect to the head of the first listener. An electronic device (e.g., the first WED, the second WED, or another electronic device) calculates, from the first coordinate location, a second coordinate location that defines the location in empty space with respect to a head of the second listener. An electronic device (e.g., the first WED, the second WED, or another electronic device) processes the sound with second HRTFs so the sound externally localizes as the binaural sound to the location in empty space at least one meter away from the head of the second listener such that the first and second listeners hear the binaural sound originating from a same location.

Consider the example embodiment of the second method in which the first coordinate location is wirelessly transmitted from the first WED to the second WED without sharing the first HRTFs with the second WED in order to maintain the first HRTFs private to the first listener.

Consider the example embodiment of the second method in which the second WED shares, with the first WED, the second coordinate location that defines the location in empty space with respect to the head of the second listener without sharing the second HRTFs with the first WED in order to maintain the second HRTFs private to the second listener.

Consider the example embodiment of the second method in which the method transmits, between the first and second WEDs, a signal that verifies the first and second listeners hear the binaural sound originating from the same location.

Consider the example embodiment of the second method in which the method processes, with the first wearable electronic device worn by the first listener and with the first HRTFs, the sound so the sound continues to localize to the location in empty space at least one meter away from the head of the first listener as the head of the first listener moves. The method also processes, with the second wearable electronic device worn by the second listener and with the second HRTFs, the sound so the sound continues to localize to the location in empty space at least one meter away from the head of the second listener as the head of the second listener moves such that the first and second listeners continue to hear the binaural sound originating from the same location as the heads of the first and second listeners move.

Consider the example embodiment of the second method in which the method determines a location of the first listener with respect to the second listener, the first listener being an origin for the first coordinate location. The method further calculates the second coordinate location from the first coordinate location and the location of the first listener with respect to the second listener.

Consider the example embodiment of the second method in which the method further tracks, with the first and second wearable electronic devices, head movements of the first and second listeners while the first and second listeners hear the binaural sound originating from the same location. The method further synchronizes the first and second wearable electronic devices to maintain the binaural sound originating from the same location to both first and second listeners by sharing the head movements of the first and second listeners between the first and second wearable electronic devices.

Consider an example embodiment of a third method that improves playing of binaural sound to a first user wearing a first wearable electronic device (WED) and second user wearing a second WED who are both situated in a room. A first digital signal processor (DSP) processes (with first head-related transfer functions (HRTFs) having first coordinates) sound that externally localizes in the room as the binaural sound to a location in empty space that is a first sound localization point (SLP) having the first coordinates with respect to a head of the first user. The first SLP is shared with the second WED by wirelessly transmitting the first SLP from the first WED to the second WED. The method determines, from the coordinates of the first SLP received from the first WED, a second SLP having second coordinates with respect to a head of the second user and further determines, from the second SLP, second HRTFs having the second coordinates. A second DSP processes (with the second HRTFs having the second coordinates) the sound that externally localizes in the room as the binaural sound to the location in empty space such that the first and second users hear the binaural sound originating from a same location in the room.

Consider the example embodiment of the third method in which the method further shares the first SLP with the second WED without sharing the first HRTFs with the second WED in order to maintain the first HRTFs private to the first user.

Consider the example embodiment of the third method in which the method extracts, from the first HRTFs, the first coordinates and then wirelessly transmits the first coordinates from the first WED to the second WED without transmitting and sharing the first HRTFs with the second WED.

Consider the example embodiment of the third method in which the first and second WEDs synchronize with each other so the binaural sound continues to originate from the same location in the room to the first and second users while the first and second users change head orientations and move in the room.

Consider the example embodiment of the third method in which the first and second WEDs track head movements of the first and second users. The method further verifies that the binaural sound continues to originate from the same location in the room to the first and second users by sharing the head movements between the first and second WEDs.

Consider the example embodiment of the third method in which the method tracks head movements of the first and second users to verify that the first and second users are looking at the same location in the room while the binaural sound plays to the first and second users.

Figure 6:
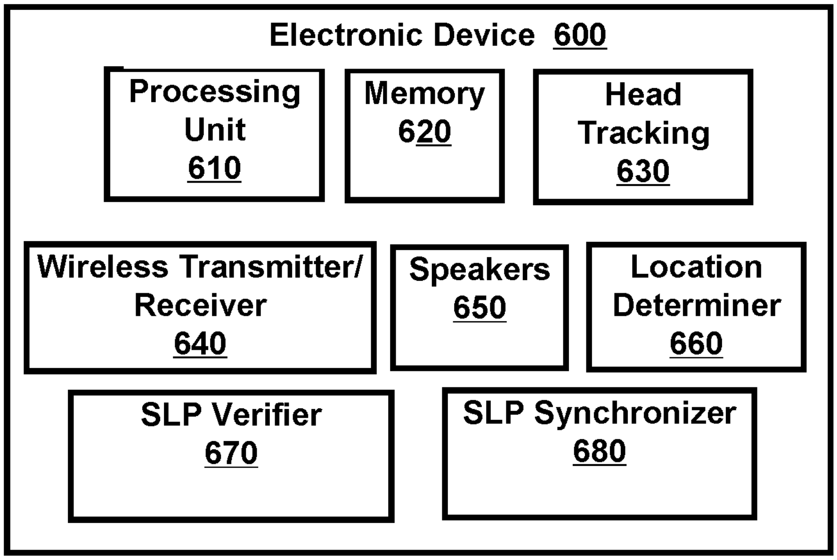
FIG. 6 is an example of an electronic device in accordance with an example embodiment.

FIG. 6 is an example of an electronic device 600 in accordance with an example embodiment.

The electronic device 600 includes a processor or processing unit 610, memory 620, head tracking 630, a wireless transmitter/receiver 640, speakers 650, location determiner 660, SLP verifier, and SLP synchronizer 680.

The processor or processing unit 610 includes a processor and/or a digital signal processor (DSP). For example, the processing unit includes one or more of a central processing unit, CPU, digital signal processor (DSP), microprocessor, microcontrollers, field programmable gate arrays (FPGA), application-specific integrated circuits (ASIC), etc. for controlling the overall operation of memory (such as random access memory (RAM) for temporary data storage, read only memory (ROM) for permanent data storage, and firmware).

Consider an example embodiment in which the processing unit includes both a processor and DSP that communicate with each other and memory and perform operations and tasks that implement one or more blocks of the flow diagram discussed herein. The memory, for example, stores applications, data, programs, algorithms (including software to implement or assist in implementing example embodiments) and other data.

For example, a processor or DSP executes a convolving process with the retrieved HRTFs or HRIRs (or other transfer functions or impulse responses) to process sound so that the sound is adjusted, placed, or localized for a listener away from but proximate to the head of the listener. For example, the DSP converts mono or stereo sound to binaural sound so this binaural sound externally localizes to the user. The DSP can also receive binaural sound and move its localization point, add or remove impulse responses (such as RIRs), and perform other functions.

For example, an electronic device or software program convolves and/or processes the sound captured at microphones of an electronic device and provides this convolved sound to the listener so the listener can localize the sound and hear it. The listener can experience a resulting localization externally (such as at a sound localization point (SLP) associated with near field HRTFs and far field HRTFs) or internally (such as monaural sound or stereo sound).

The memory 620 stores SLI, HRTFs, HRIRs, BRTFs, BRIRs, RTFs, RIRs, or other transfer functions and/or impulse responses for processing and/or convolving sound. The memory can also store instructions for executing one or more example embodiments.

The head tracking 630 includes hardware and/or software to determine or track head orientations and/or head movements of the wearer or user of the electronic device. For example, the head tracking tracks changes to head orientations or changes in head movement of a user while the user moves his or her head while listening to sound played through the speakers 650. Head tracking includes one or more of an accelerometer, gyroscope, magnetometer, inertial sensor, compass, MEMs sensor, camera, or other hardware to track head orientations.

Location determiner 660 includes hardware and/or software to execute one or more example embodiments that determine one or more of a location of the user, a location of the electronic device of the user, and a location of a sound localization point (SLP). For example, the location determiner determines a location that defines a location in empty or occupied space where one or more users hear binaural sound. For instance, the location determiner calculates a coordinate location of the SLP(s) with respect to a user and provides, shares, or exchanges this information with another user or electronic device. Further, the location determiner includes and/or executes one or more blocks discussed herein, such as blocks 110, 120, 210, and 220.

SLP verifier 670 includes hardware and/or software that verifies one or more sound localization points (SLPs). For example, the SLP verifier includes and/or executes instructions that verify two or more users hear binaural sound originate from a same or similar location. The SLP verifier includes and/or executes one or more blocks discussed herein, such as block 310.

SLP synchronizer 680 includes hardware and/or software that synchronizes one or more sound localization points (SLPs). For example, the SLP synchronizer includes and/or executes instructions that synchronizes two or more SLPs and/or electronic devices so two or more users hear binaural sound originating from a same or similar location. The SLP synchronizer includes and/or executes one or more blocks discussed herein, such as block 410.

Consider an example embodiment in which microphones in a PED (such as a smartphone, HPED, or WED) capture mono or stereo sound, and the PED transmits this sound to an electronic device in accordance with an example embodiment. This electronic device receives the sound, processes the sound with HRTFs of the user, and provides the processed sound as binaural sound to the user through two or more speakers. For instance, this electronic device communicates with the PED during a telephone call or software game between a first user with the PED and a second user with a PED such that both users hear binaural sound externally localize to a same or similar location.

In an example embodiment, sounds are provided to the listener through speakers, such as headphones, earphones, stereo speakers, bone conduction, etc. The sound can also be transmitted, stored, further processed, and provided to another user, electronic device or to a software program or process (such as an intelligent user agent, bot, intelligent personal assistant, or another software program).

Figure 7:
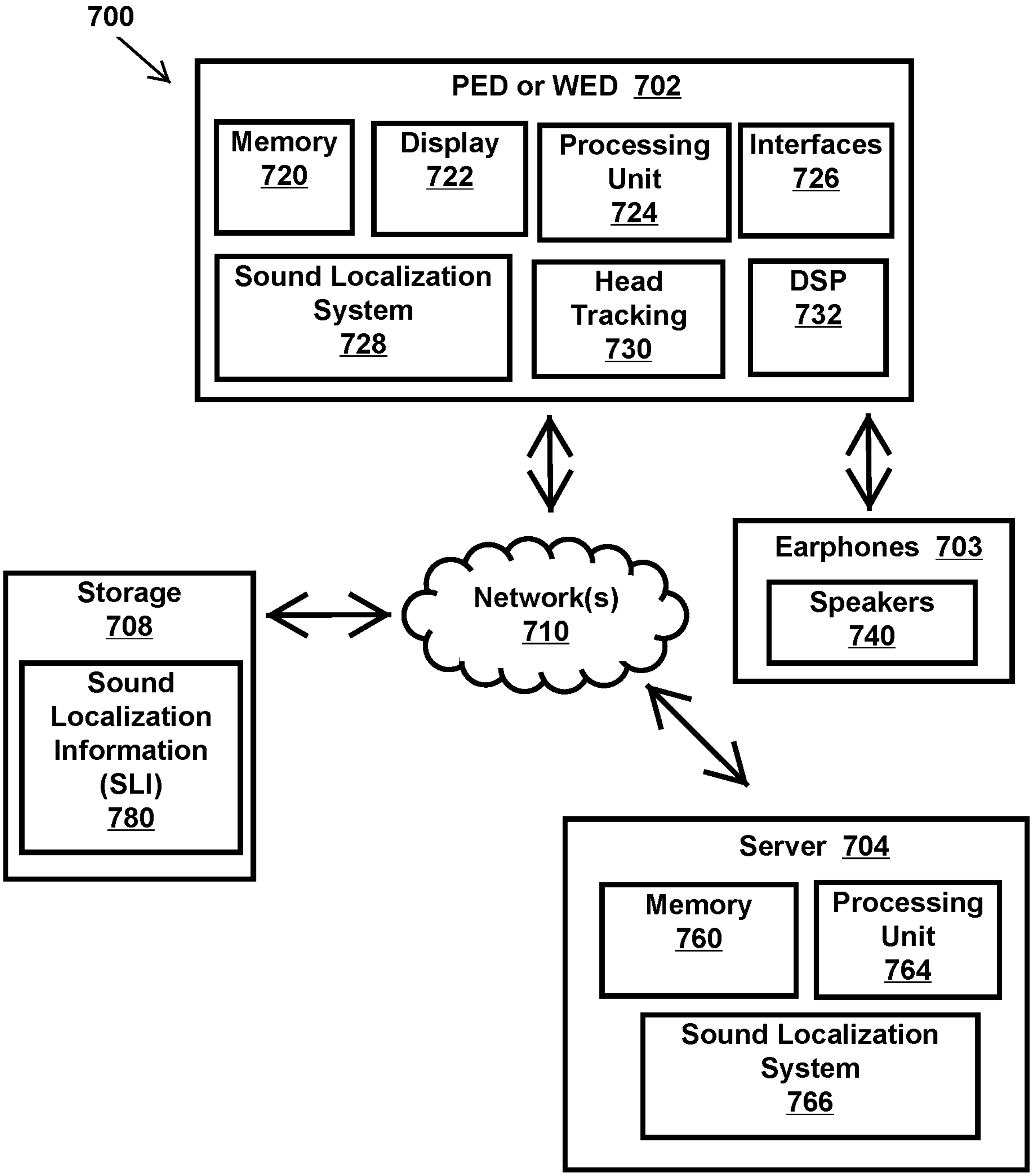
FIG. 7 is an electronic system or computer system that provides binaural sound to a same or similar location to two or more users in accordance with an example embodiment.

FIG. 7 is an electronic system or computer system 700 that provides binaural sound to a same or similar location to two or more users in accordance with an example embodiment.

The computer system includes a portable electronic device (PED) or wearable electronic device (WED) 702, one or more computers or electronic devices (such as one or more servers) 704, and storage or memory 708 that communication over one or more networks 710. Although a single PED or WED 702 and a single computer 704 are shown, example embodiments include hundreds, thousands, or more of such devices that communicate over networks.

The PED or WED 702 includes one or more components of computer readable medium (CRM) or memory 720 (such as memory storing instructions to execute one or more example embodiments), a display 722, a processing unit 724 (such as one or more processors, microprocessors, and/or microcontrollers), one or more interfaces 726 (such as a network interface, a graphical user interface, a natural language user interface, a natural user interface, a phone control interface, a reality user interface, a kinetic user interface, a touchless user interface, an augmented reality user interface, and/or an interface that combines reality and virtuality), a sound localization system 728, head tracking 730, and a digital signal processor (DSP) 732.

The PED or WED 702 communicates with wired or wireless headphones, earbuds, or earphones 703 that include speakers 740 or other electronics (such as microphones).

The storage 708 includes one or more of memory or databases that store one or more of audio files, sound information, sound localization information, audio input, SLPs, software applications, user profiles and/or user preferences (such as user preferences for SLP locations and sound localization preferences), impulse responses and transfer functions (such as HRTFs, HRIRs, BRIRs, and RIRs), and other information discussed herein.

Electronic device 704 (shown by way of example as a server) includes one or more components of computer readable medium (CRM) or memory 760, a processing unit 764 (such as one or more processors, microprocessors, and/or microcontrollers), and a sound localization system 766.

The electronic device 704 communicates with the PED or WED 702 and with storage or memory 708 that stores sound localization information (SLI) 780, such as transfer functions and/or impulse responses (e.g., HRTFs, HRIRs, BRIRs, etc. for multiple users) and other information discussed herein. Alternatively or additionally, the transfer functions and/or impulse responses and other SLI are stored in memory 760 or 720 (such as local memory of the electronic device providing or playing the sound to the listener).

The electronic devices can share, exchange, and/or provide information to and with each other as discussed herein (e.g., exchange SLPs, location data, head tracking or head movement data, SLI etc.). This information can be shared directly between such electronic devices (e.g., transmitted from one PED to another PED), shared indirectly between electronic devices (e.g., transmitted from one PED, to a server, and from the server to another PED), or shared in other ways (e.g., providing or authorizing access to a server or electronic device to memory or data in memory, such as a user's SLI, SLP, location data, etc.).

A sound localization system includes hardware and/or software to execute one or more example embodiments that determine one or more of a location of the user, a location of the electronic device of the user, and a location of a sound localization point (SLP), instructions that verify two or more users hear binaural sound originate from a same or similar location, and instructions that synchronize two or more SLPs and/or electronic devices so two or more users hear binaural sound originating from a same or similar location. The sound localization system further executes to convolve and/or process sound as discussed herein.

Figure 8:
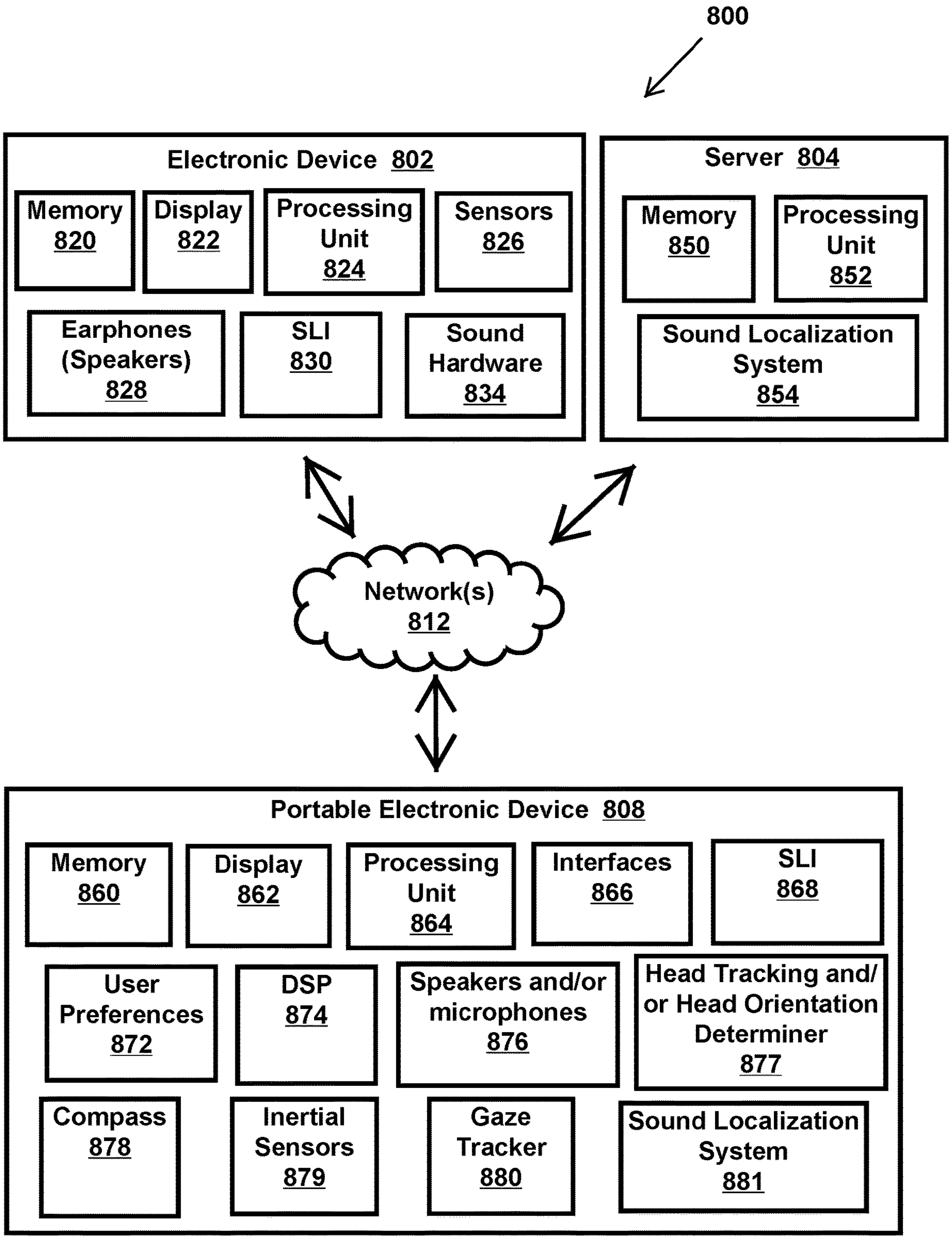
FIG. 8 is an electronic system or computer system that provides binaural sound to a same or similar location to two or more users in accordance with an example embodiment.

FIG. 8 is an electronic system or computer system 800 that provides binaural sound to a same or similar location to two or more users in accordance with an example embodiment.

The system 800 includes an electronic device 802, a computer or server 804, and a portable electronic device 808 (including wearable electronic devices) in communication with each other over one or more networks 812.

Portable electronic device 802 includes one or more components of computer readable medium (CRM) or memory 820 (e.g., storing instructions to execute one or more blocks discussed herein), one or more displays 822, a processor or processing unit 824 (such as one or more microprocessors and/or microcontrollers), one or more sensors 826 (such as micro-electro-mechanical systems sensor, an activity tracker, a pedometer, a piezoelectric sensor, a biometric sensor, an optical sensor, a radio-frequency identification sensor, a global positioning satellite (GPS) sensor, a solid state compass, gyroscope, magnetometer, and/or an accelerometer), earphones with speakers 828, sound localization information (SLI) 830, and sound hardware 834.

Server or computer 804 includes computer readable medium (CRM) or memory 850, a processor or processing unit 852, and sound localization system 854.

Portable electronic device 808 includes computer readable medium (CRM) or memory 860 (including instructions to execute one or more blocks discussed herein), one or more displays 862, a processor or processing unit 864, one or more interfaces 866 (such as interfaces discussed herein), sound localization information 868 (e.g., stored in memory), user preferences 872 (e.g., coordinate locations and/or HRTFs where the user prefers to hear binaural sound), one or more digital signal processors (DSP) 874, one or more of speakers and/or microphones 876, head tracking and/or head orientation determiner 877, a compass 878, inertial sensors 879 (such as an accelerometer, a gyroscope, and/or a magnetometer), gaze detector or gaze tracker 880, and sound localization system 881.

The networks include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

A sound localization system (SLS) includes one or more of a processor, microprocessor, controller, memory, specialized hardware, and specialized software to execute one or more example embodiments (including one or more methods discussed herein and/or blocks discussed herein). By way of example, the hardware includes a customized integrated circuit (IC) or customized system-on-chip (SoC) to location, synchronize, and/or verify a SLP so binaural sound localizes to a same or similar location for two or more users. For instance, an application-specific integrated circuit (ASIC) or a structured ASIC are examples of a customized IC that is designed for a particular use, as opposed to a general-purpose use. Such specialized hardware also includes field-programmable gate arrays (FPGAs) designed to execute a method discussed herein and/or one or more blocks discussed herein.

The sound localization system performs various tasks with regard to managing, generating, interpolating, extrapolating, retrieving, storing, selecting, and correcting SLPs and function in coordination with and/or be part of the processing unit and/or DSPs or incorporate DSPs. These tasks include generating audio impulses, generating audio impulse responses or transfer functions for a person, locating or determining SLPs, sharing or providing SLPs, selecting SLPs for a user, and executing other functions to provide binaural sound to a user as discussed herein.

By way of example, the sound hardware includes a sound card and/or a sound chip. A sound card includes one or more of a digital-to-analog (DAC) converter, an analog-to-digital (ATD) converter, a line-in connector for an input signal from a sound source, a line-out connector, a hardware audio accelerator providing hardware polyphony, and one or more digital-signal-processors (DSPs). A sound chip is an integrated circuit (also known as a "chip") that produces sound through digital, analog, or mixed-mode electronics and includes electronic devices such as one or more of an oscillator, envelope controller, sampler, filter, and amplifier. The sound hardware is or includes customized or specialized hardware that processes and convolves mono and stereo sound into binaural sound.

By way of example, a computer and electronic devices include, but are not limited to, handheld portable electronic devices (HPEDs), wearable electronic glasses, headphones, watches, wearable electronic devices (WEDs) or wearables, smart earphones or hearables, voice control devices (VCD), voice personal assistants (VPAs), network attached storage (NAS), printers and peripheral devices, virtual devices or emulated devices (e.g., device simulators, soft devices), cloud resident devices, computing devices, electronic devices with cellular or mobile phone capabilities or subscriber identification module (SIM) cards, digital cameras, desktop computers, servers, portable computers (such as tablet and notebook computers), smartphones, electronic and computer game consoles, home entertainment systems, digital audio players (DAPs) and handheld audio playing devices (e.g., handheld devices for downloading and playing music and videos), appliances (including home appliances), head mounted displays (HMDs), optical head mounted displays (OHMDs), personal digital assistants (PDAs), electronics and electronic systems in automobiles (including automobile control systems), combinations of these devices, devices with a processor or processing unit and a memory, and other portable and non-portable electronic devices and systems (such as electronic devices with a DSP).

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Examples herein can take place in physical spaces, in computer rendered spaces (such as computer games or VR), in partially computer rendered spaces (AR), and in mixed reality or combinations thereof.

The processor unit includes a processor (such as a central processing unit, CPU, microprocessor, microcontrollers, field programmable gate arrays (FPGA), application-specific integrated circuits (ASIC), etc.) for controlling the overall operation of memory (such as random access memory (RAM) for temporary data storage, read only memory (ROM) for permanent data storage, and firmware). The processing unit and DSP communicate with each other and memory and perform operations and tasks that implement one or more blocks of the flow diagrams discussed herein. The memory, for example, stores applications, data, programs, algorithms (including software to implement or assist in implementing example embodiments) and other data.

Consider an example embodiment in which the SLS or portions of the SLS include an integrated circuit FPGA that is specifically customized, designed, configured, or wired to execute one or more blocks discussed herein. For example, the FPGA includes one or more programmable logic blocks that are wired together or configured to execute combinational functions for the SLS, such as convolving mono or stereo sound into binaural sound, locating/sharing/providing/determining/etc. SLPs.

Consider an example in which the SLS or portions of the SLS include an integrated circuit or ASIC that is specifically customized, designed, or configured to execute one or more blocks discussed herein. For example, the ASIC has customized gate arrangements for the SLS. The ASIC can also include microprocessors and memory blocks (such as being a SoC (system-on-chip) designed with special functionality to execute functions of the SLS).

Consider an example in which the SLS or portions of the SLS include one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED (including headphones) includes a customized or dedicated DSP that executes one or more blocks discussed herein (including processing and/or convolving sound into binaural sound and locating/sharing/providing SLPs so two or more listeners hear binaural sound from a same or similar location). Such a DSP has a better power performance or power efficiency compared to a general-purpose microprocessor and is more suitable for a HPED or WED due to power consumption constraints of the HPED or WED. The DSP can also include a specialized hardware architecture, such as a special or specialized memory architecture to simultaneously fetch or pre-fetch multiple data and/or instructions concurrently to increase execution speed and sound processing efficiency and to quickly locate/share/provide SLPs as discussed herein. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider an example in which the DSP includes the SLS and/or one or more of a location determiner, SLP verifier, and SLP synchronizer. For example, the location determiner, SLP verifier, SLP synchronizer and/or the DSP are integrated onto a single integrated circuit die or integrated onto multiple dies in a single chip package to expedite binaural sound processing.

Consider another example in which HRTFs (or other transfer functions or impulse responses) are stored or cached in the DSP memory or local memory relatively close to the DSP to expedite binaural sound processing.

Consider an example in which a HPED (e.g., a smartphone), PED, or WED includes one or more dedicated sound DSPs (or dedicated DSPs for sound processing, image processing, and/or video processing). The DSPs execute instructions to convolve sound and display locations of SLPs. Further, the DSPs simultaneously convolve multiple SLPs to a user. These SLPs can be moving with respect to the face of the user so the DSPs convolve multiple different sound signals and sources with HRTFs that are continually, continuously, or rapidly changing.

As used herein, "about" means near or close to.

As used herein, a "telephone call" is a connection over a wired and/or wireless network between a calling person or user and a called person or user. Telephone calls use landlines, mobile phones, satellite phones, HPEDs, WEDs, voice personal assistants (VPAs), computers, and other portable and non-portable electronic devices. Further, telephone calls are placed through one or more of a public switched telephone network, the internet, and various types of networks (such as Wide Area Networks or WANs, Local Area Networks or LANs, Personal Area Networks or PANs, Campus Area Networks or CANs, private or public ad-hoc mesh networks, etc.). Telephone calls include other types of telephony including Voice over Internet Protocol (VoIP) calls, internet telephone calls, in-game calls, voice chat or channels, telepresence, etc.

As used herein, "headphones" or "earphones" include a left and right over-ear ear cup, on-ear pad, or in-ear monitor (IEM) with one or more speakers or drivers for a left and a right ear of a wearer. The left and right cup, pad, or IEM may be connected with a band, connector, wire, or housing, or one or both cups, pads, or IEMs may operate wirelessly being unconnected to the other. The drivers may rest on, in, or around the ears of the wearer, or mounted near the ears without touching the ears.

As used herein, the word "proximate" means near. For example, binaural sound that externally localizes away from but proximate to a user localizes within three meters of the head of the user.

As used herein, the word "similar" means resemble without being identical or the same. For example, two users hear binaural sound as originating from a sofa (or other object), but the two locations at the sofa are not the same or exact but are near each other so that both users look to the sofa.

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones in its ears or about six inches apart).

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A method that improves communication between a first user, a second user, and a person, the method comprising:

playing, with a first wearable electronic device (WED) worn on a head of the first user and during the communication, a voice of the person in binaural sound that externally localizes to the first user at a location in a room where the first user and the second user are located;

determining locations of physical objects in the room where the first user and the second user are located;

improving the communication by sharing, with a second WED worn on a head of the second user, the location in the room where the first user hears the voice of the person in the binaural sound; and playing, with the second WED and during the communication, the voice of the person in the binaural sound that externally localizes to the second user at the location in the room so the first user and the second user hear the voice of the person originate from a common location in the room during the communication between the first user, the second user, and the person, wherein sharing the location in the room includes sharing a location at one of the physical objects where the first WED displays an augmented reality (AR) image of the person during the communication with the person, and the communication is a telephone call.

2. The method of claim 1 further comprising:

verifying a sound localization point (SLP) where the first user hears the voice of the person and where the second user hears the voice of the person both occur at the common location in the room.

3. The method of claim 1 further comprising:

transmitting, by the second WED, a request to join the communication; and receiving, by the second WED, the location in the room in response to transmitting the request to join the communication.

4. The method of claim 1, wherein the common location in the room occurs on a physical object in the room where both the first WED and the second WED display the AR image of the person during the communication between the first user, the second user, and the person.

5. The method of claim 1 further comprising:

adjusting convolution of the voice of the person in the binaural sound so both the first user and the second user continue to hear the voice of the person originate from the common location in the room in response to the first user and the second user moving with respect to the common location in the room.

6. The method of claim 1, wherein the sharing the location in the room includes sharing location data that includes a coordinate location of an object in the room where the first user and the second user are located.

7. A method that improves a communication between a first user, a second user, and a person, the method comprising:

playing, with a first wearable electronic device (WED) worn on a head of the first user, binaural sound of a voice of the person that externally localizes to a location in a room where the first WED displays an augmented reality (AR) image or a virtual reality (VR) image;

improving the communication by sharing, with a second WED worn on a head of the second user, the location in the room where the first WED displays the AR image or the VR image; and playing, with the second WED worn on the head of the second user, the binaural sound of the voice of the person that externally localizes to the location in the room where both the first WED displays the AR image or the VR image and the second WED displays the AR image or the VR image during the communication.

8. The method of claim 7 further comprising:

verifying that the binaural sound of the voice of the person localizes to the location in the room to both the first user and the second user.

9. The method of claim 7, wherein the sharing includes providing to the second WED a location of an object in a room where the first WED displays the AR image or the VR image.

10. The method of claim 7 further comprising:

verifying that the first WED and the second WED display the AR image or the VR image at the location in the room by comparing coordinates where the first WED displays the AR image or the VR image with coordinates where the second WED displays the AR image or the VR image.

11. The method of claim 7, wherein the sharing includes providing the second WED with coordinates of a physical object where the first WED displays the AR image or the VR image.

12. The method of claim 7, wherein the sharing includes providing a location in VR where the first WED displays the VR image.

13. The method of claim 7, wherein the sharing includes providing the second WED with a location of an object in a physical environment where the binaural sound is processed to originate for the first user.

14. An electronic system that improves a communication between a first user, a second user, and a person, the electronic system comprising:

a first wearable electronic device (WED) worn on a head of the first user and includes a first display that displays, during the communication, an augmented reality (AR) image of the person at a location in a room where the first and the second users are located; and a second WED worn on a head of the second user and includes a second display that displays, during the communication, the AR image of the person at the location in the room, wherein the electronic system improves the communication by sharing, with the second WED, the location in the room so binaural sound of a voice of the person originates from a common location in the room to both the first user and the second user during the communication between the first user, the second user, and the person.

15. The electronic system of claim 14 further comprising:

a transmitter in the second WED that transmits a request to the first WED to join the communication; and a receiver in the second WED that receives, in response to transmitting the request, the location where the first WED displays the AR image of the person.

16. The electronic system of claim 14 further comprising:

a transmitter in the second WED that transmits a request for the location where the first WED displays the AR image of the person; and a receiver in the second WED that receives, in response to transmitting the request, the location where the first WED displays the AR image of the person.

17. The electronic system of claim 14 further comprising:

a transmitter in the second WED that transmits a request to join the communication; and a receiver in the second WED that receives, in response to transmitting the request, a location on a physical object in the room where the AR image of the person is displayed.

18. The electronic system of claim 14, wherein the second WED receives the location in the room that includes a coordinate location, and the second WED selects, from the coordinate location, head-related transfer functions (HRTFs) to process the voice of the person so the first user and the second user hear the binaural sound originate from the common location in the room.

19. The electronic system of claim 14, wherein the communication is a telephone call in which the first WED and the second WED display the AR image of the person at the common location on a physical object in the room.

* * * * *